Nov. 26, 1968     C. L. STEARNS     3,413,396
PIGMENT MARKING GELATIN CAPSULES
Filed June 14, 1963     2 Sheets-Sheet 1
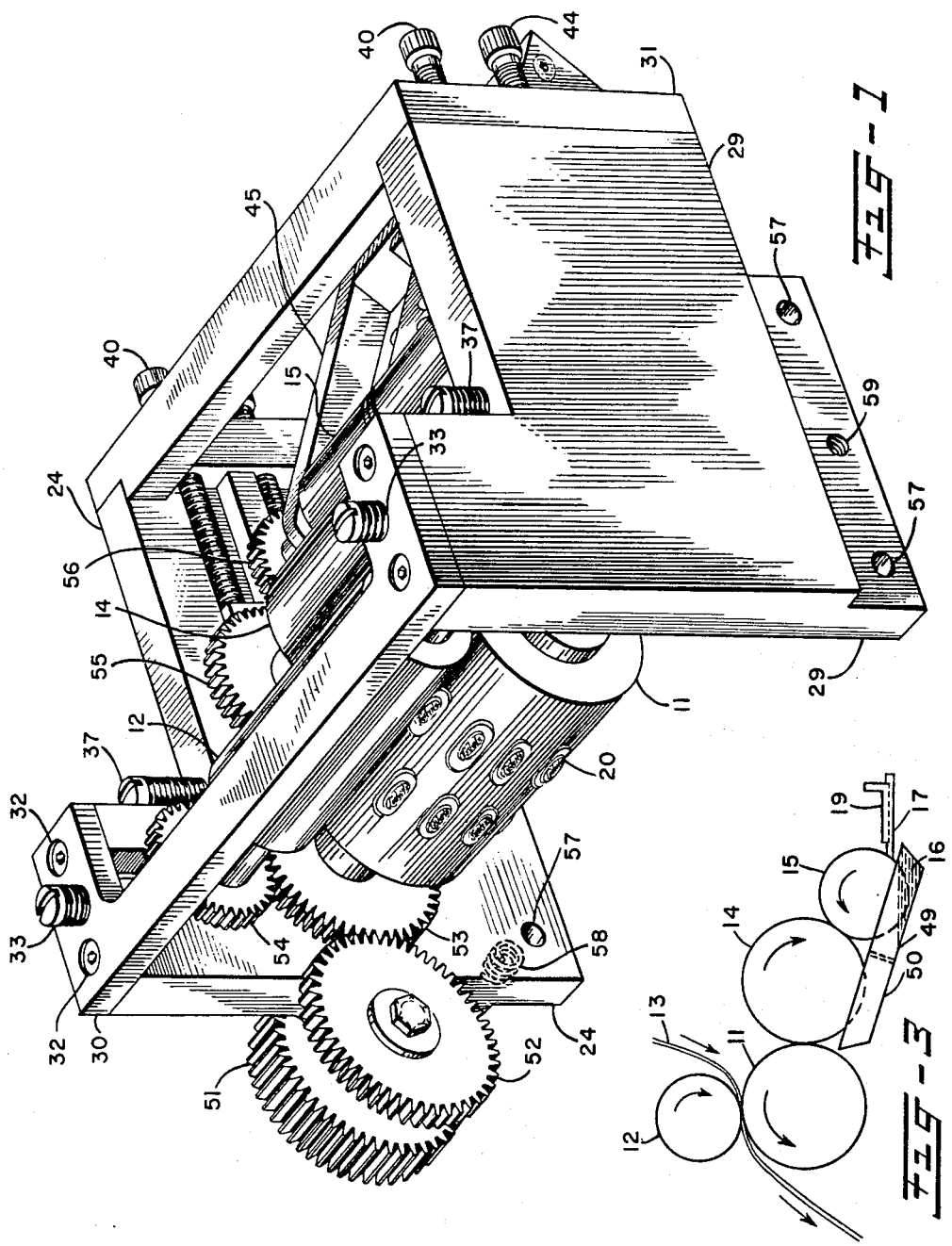
INVENTOR
CARL LOUIS STEARNS
BY
ATTORNEY Nov. 26, 1968　　　C. L. STEARNS　　　3,413,396
PIGMENT MARKING GELATIN CAPSULES
Filed June 14, 1963　　　2 Sheets-Sheet 2
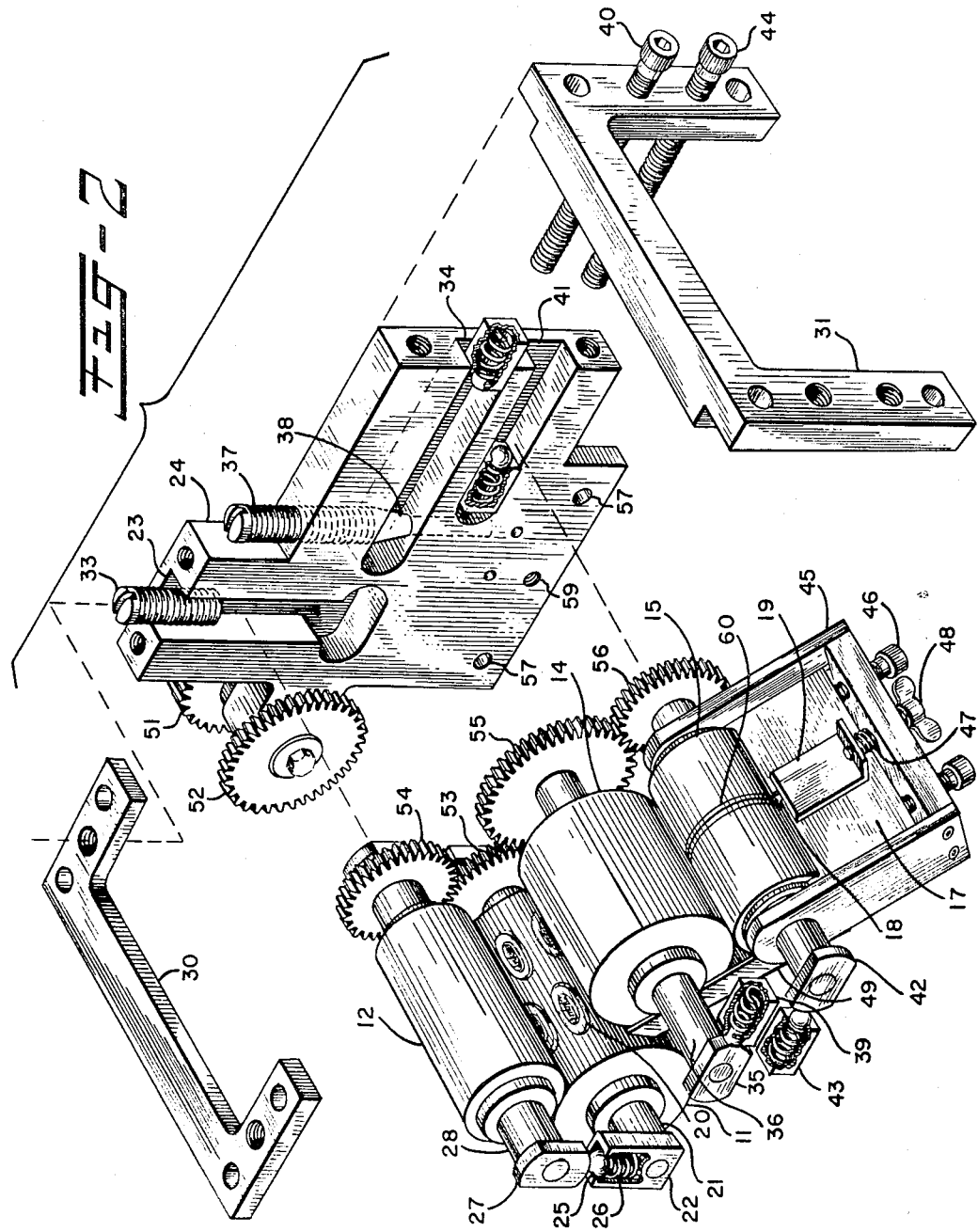
INVENTOR
CARL LOUIS STEARNS
BY
ATTORNEY United States Patent Office 3,413,396
Patented Nov. 26, 1968

3,413,396
PIGMENT MARKING GELATIN CAPSULES
Carl Louis Stearns, Orangeburg, N.Y., assignor to American Cyanamid Company, Stamford, Conn., a corporation of Maine
Filed June 14, 1963, Ser. No. 287,826
1 Claim. (Cl. 264—132)

ABSTRACT OF THE DISCLOSURE

A method of marking a gelatin strip to be formed into capsules, with a fluid composed of a pigment, polyacrylamide, glycerine, a surfactant and water; forming capsules from the marked strip and thereafter drying the capsules.

---

This invention relates to a method of marking a gelatin strip made into capsules with a pigment composition containing an insoluble pigment such as a non-toxic pigment, lake or dye in water with a water-soluble vinyl polymer binder such as polyacrylamide, polyvinylpyrrolidone, polyvinylpyrrolidone-vinylacetate copolymer, a water-miscible plasticizer such as glycerine or propylene glycol and preferably a water-soluble non-toxic surface active agent, and use thereof.

In marking soft gelatin capsules, compositions have been used for marking on the surface of a gelatin strip with a dye before the strip is formed into capsules. One such embodiment is described in United States Patent 2,624,163, F. E. Stirn, "Method of Making Colored Gelatin Capsules," Jan. 6, 1953. A different marking composition is described in United States Patent 2,821,821, E. C. Yen, "Marking Gelatin Capsules," Feb. 4, 1958. A machine for applying marking fluid to strip gelatin to be used for marking capsules is described in United States Patent 2,929,320, L. F. Hansen and R. Glorig, "Machine For Marking Capsules," Mar. 22, 1960.

The capsules themselves may be formed on a machine such as described in United States Patent 2,775,080, Stirn and Taylor, "Method of Filling Powder-and-Liquid Filled Capsules," Dec. 25, 1956, or United States Patent 2,697,317, Stirn and Taylor, "Capsule Forming Die Roll," Dec. 21, 1954.

The present invention may be used with such machines or with other machines for forming capsules and the composition may be used not only to mark on soft gelatin capsules during the process of their formation, but after the capsules are formed.

Dyes are conveniently used to mark on the surface of light-colored capsules but where the main body of the capsule itself is dark, a dye which has additional color is difficult to read and a sufficiently heavy dye impression may result in bleeding.

A new development in identification of capsules is marking of the capsules first on a colorless or white capsule and then surface dyeing the capsule with the marking showing through the surface coloring. For such a procedure, particularly if the capsule is to be colored a dark color, dyes give a dim impression. In the past, the use of pigments for surface marking has not been practical because of difficulties in commercial marking, including adhesion, pigment transfer, off-setting and chipping of the pigment.

A soft gelatin strip before the capsules are made, must have a considerable portion of glycerine and water so that good sealing is obtained. After the capsules have been manufactured by cutting out the capsules from the gelatin strips the strips are still quite tender. To permit handling of the capsules after manufacture and before dyeing, it is necessary that the marking composition rapidly permeate and become affixed to the gelatin strip so that the marking does not offset or bleed. If the capsules thus marked are to be additionally dyed, the marking must be compatible with the later dyeing composition. It is easy to find a composition which will have some of the desired attributes but a commercially-satisfactory pigment composition is more difficult to prepare. Because the dyes usually used for marking are soluble in a polyhydric alcohol-water system, a dye system used for marking easily penetrates and leaves the dye in the surface of the film, so that no dripping problem is involved. Additionally, dyes are soluble, and hence redissolve in the solvent system of choice and hence do not cake on the printing unit. Pigments are already solid particles, and hence remain on the surface of the capsule, and are more apt to chip off or offset, and are not readily resuspendable, and hence clog the printing unit.

It has now been found that a suspension of a non-toxic insoluble pigment in water with a water-soluble vinyl polymer binder and a water-miscible plasticizer and preferably with a wetting agent, forms a marking composition which may be readily used to mark wet gelatin capsules, or the strip from which the capsules are made. By wet capsules is meant the filled capsules, after forming but before drying.

The insoluble coloring matter is preferably titanium dioxide, although calcium carbonate or barium sulfate may be used and, if desired, an insoluble non-toxic colored pigment, which may be a lake or a non-toxic dye, where color in the mark is desired. A group of non-toxic dyes is described in "The Application Properties of Certified Coal Tar Colors" by William Peacock, American Cyanamid Company, Bound Brook, N.J. (1944). These dyes are converted to insoluble lakes by conventional processes, or may be used as soluble or partially soluble dyes with a pigment to give additional color.

The binder is a polymer of a vinyl compound. The polymers of acrylamide, vinyl pyrrolidone, vinyl acetate and the copolymers of the same give good results. Because such polymers may be brittle, a water-miscible polyhydric alcohol plasticizer, either glycerine or propylene glycol, is preferred. Glycerine and propylene glycol are both non-toxic and penetrate into a gelatin film. Propylene glycol is the more rapid and hence preferred. The speed of penetration is increased if a small portion of a non-toxic water-soluble wetting agent is present. Sodium bis(2-ethylhexyl) sulfosuccinate (Aerosol OT ®) gives good results as does polyoxyethylene sorbitan monooleate and polyoxyethylene stearate. A bis(2-ethylhexyl) sulfosuccinate, usually as an alkali metal salt, meets with widest acceptance as in larger quantities it is known to be a very acceptable laxative and, hence, the toxicity is known to be very low. The amounts used in the formula for capsules is so low that there is no appreciable laxative action. The water-soluble plasticizer is preferably used in the range of about 15 to 40% by weight of the composition, the resinous binder in amounts of 10 to 30% and the wetting agent between about 0.05 and 1.5%, the range of 0.1 to 1% being preferred. A concentration of the pigments of from 30 to 45% is preferred with not less than 10% water being present.

As exemplary of the formulations, a mixture was prepared containing 297 parts of titanium dioxide, 223 parts of propylene glycol, and 9.2 parts of distilled water with 358 parts of a 20% solids solution of a polyacrylamide having a molecular weight of about 10,000. 0.8 part of 75% sodium bis(2-ethylhexyl) sulfosuccinate was added, and the mixture stirred at 75 to 80° C. until the pigment was uniformly dispersed. The pigment was used for marking on the surface of a soft gelatin strip from which soft gelatin capsules were formed and subsequently dried. A red gelatin formula was used. A clear white marking stood out on the surface of the final product.

The present pigment composition requires a special printing unit to give a good consistent marking without constant attention to the printing unit. This printing unit is shown in the accompanying drawings in which:

FIGURE 1 is a pictorial view of the assembled pigment printer.

FIGURE 2 is a pictorial exploded view of the pigment printer.

FIGURE 3 is a diagrammatic cross section of the roll system of the pigment printer.

As shown in FIGURE 3, the essential elements of the pigment printer include a marking roll 11, which corresponds to the printing roll of the more conventional printing couples; and adjacent thereto a pressure roll 12. Between these two rolls passes the gelatin strip 13. Adjacent to the marking roll 11, and bearing against raised portions of the marking roll, is the pigment marking fluid transfer and spreading roll 14, sometimes hereafter shortened to the transfer roll. In contact with the transfer roll is the pigment pick-up roll 15. The pigment pick-up roll, which rotates in the pigment marking fluid 16, bears against the transfer roll 14, and a notched doctor blade 17 doctors or scrapes the pigment marking fluid from the pigment pick-up roll except at the notch 18. The cross section of the notch is varied by the notch adjusting doctor 19.

Thus, a very narrow band of pigment marking fluid of adjustable cross section passes through the notch in the notched doctor blade and is spread over the surface of the transfer and spreading roll 14 as the pigment fluid passes between the bite of the transfer and spreading roll and the pigment pick-up roll, thus giving a uniform coating on the transfer and spreading roll which is transferred to the raised portions of the marking roll and thus to the gelatin strip being marked.

As shown in more detail in FIGURE 2, the marking roll 11 consists of a roll having integral or separate marking type 20 which are conveniently trademark or identification cuts having the design, indicia or letters to be printed on a soft gelatin strip 13. The marking roll 11 is mounted on the marking roll shaft 21 which is journaled at each end in a marking roll journal block 22. The rear marking roll journal block 22 slides in the marking roll slot 23 in the rear side plate 24. The marking roll journal block 22 has in its upper face a positioning ball 25 under which is a positioning ball spring 26.

Also sliding in the marking roll slot 23 is the pressure roll journal block 27. In the pressure roll journal block is journaled the pressure roll shaft 28 on which is mounted the pressure roll 12.

A corresponding front side plate 29 is on the front side of the assembly and of the same general configuration, except for the driven gear support. Both side plates are shown in FIGURE 1. The front side plate is omitted in FIGURE 2 to show the details of roll construction. The front and rear side plates are held apart by a top side plate spacer 30 and an end side plate spacer 31. The spacers are held to the side plates by spacer cap screws 32. Through the top side plate spacer extends a pressure roll adjusting screw 33 which bears on the pressure roll journal block 27 pressing the pressure roll towards the marking roll. The positioning ball 25 loaded by the positioning ball spring 26 tends to press the pressure and marking rolls apart, thus taking up any lost motion and permitting a very delicate adjustment of the spacing between the pressure roll 12 and the marking roll 11. Thus the pressure on the gelatin strip 13 passing therebetween is readily and accurately controlled. It is necessary that only minimum pressure be used as the gelatin strip is tender and easily damaged by pressure.

The side plates have therein, at approximately right angles to the marking roll slot 23, transfer roll slots 34, in which slides the transfer roll journal blocks 35 in which blocks is journaled the transfer roll shaft 36. At the end of the transfer roll slots, closest to the pressure roll, are conical tapered positioning screws 37. The transfer roll journal blocks 35 bear against the conical portions 38 of the positioning screws 37 and hence the entry depth of these blocks and the pressure between the transfer roll and the marking roll can be accurately controlled. Bearing against the transfer roll journal blocks are transfer roll balls and springs 39 which are compressed to increase pressure by transfer roll adjusting screws 40 threaded in the end side plate spacer 31.

Partially under and adjacent to, and conveniently parallel to, the transfer roll slots 34 are pigment pick-up roll slots 41 in which slots slide the pigment pick-up journal blocks 42, which in turn are urged backwards by the pick-up roll balls and springs 43 and which are pressed forward by the pick-up roll adjusting screws 44. The shaft of the pick-up roll 15 is journaled in said blocks 42. The spring loading of the blocks thus permits the use of the adjusting screws to give delicate control over pressures and any lost motion is taken up by spring action. The action of the journal blocks and adjusting assemblies are the same for both side plates.

Also journaled on the shaft of the pigment pick-up roll 15 is a doctor blade frame 45. In the doctor blade frame slides a notched doctor blade 17 which is held against the pigment pick-up roll 15 by the notched doctor adjusting screws 46. A notch adjusting doctor 19 slides on the surface of the notched doctor blade 17 and is urged towards the pigment pick-up roll by a biasing spring 47 and held open by a feed-adjusting screw 48.

Under the pigment pick-up roll 15 is a pigment marking fluid trough 49 holding a pigment marking fluid 16. Also in the trough is a spillage compartment 50 to pick up any marking fluid which is spilt during operation. A conventional fluid supply system is used to supply the pigment marking fluid to a constant level in the pigment marking fluid trough.

As shown in FIGURE 1, the shaft of each roll is gear driven. On the rear side plate only is mounted a wide driven gear 51 which is driven by an angularly adjustable gear on the encapsulation machine, the details of which are conventional. This is a spur gear which is wide enough so that the entire pigment marker assembly can be axially shifted for lateral register. An angularly adjustable drive gear on the encapsulating machine provides for linear register. The wide driven gear is fastened to a spur gear 52 which in turn drives the marking roll gear 53 which drives the pressure roll gear 54, and the transfer roll gear 55, which transfer roll gear drives the pigment pick-up roll gear 56.

In the lower part of the side plates are mounting holes 57 which permit the entire assembly to slide on mounting rods attached to the encapsulation machine so that the entire assembly may be axially adjusted for lateral register. Conveniently, the assembly is spring loaded in one direction by mounting springs 58 behind the assembly which is held against the spring action by an adjusting screw setting through an adjusting screw hole 59.

In operation the pigment printer assembly is mounted on the encapsulation machine so that the gelatin strip feeds between the marking roll 11 and the pressure roll 12 and the marking fluid composition is fed into the pigment fluid trough. The pigment fluid is picked up by the pigment pick-up roll. Most of the fluid is scraped off of the pigment pick-up roll by the notched doctor so that only a narrow ribbon of pigment marking fluid 60 is fed on the surface of the pigment pick-up roll and into the bite between the pigment pick-up roll and the transfer and spreading roll. Because this ribbon is comparatively narrow, about 2 mm., the volume may be more readily controlled than if a wider feed were used. Thus, the amount of pigment marking fluid fed can be exactly adjusted to a desired rate so that as the fluid is evenly spread over the surface of the transfer and spreading roll, just enough is fed to properly mark the gelatin strip.

Having described certain embodiments thereof, the invention is expressed in the following claim. All parts of both the specification and claim are by weight unless otherwise specified.

I claim:

1. A method of forming pigment marked edible soft gelatin capsules having pigmented indicia on the surface which comprises: suspending from 30 to 45 parts of titanium dioxide in a mixture of from 10 to 30 parts of a water-soluble polymer of acrylamide of the formula:

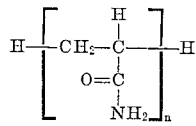

$n$ being a whole number such that the molecular weight is about 10,000, and is water soluble, and from 15 to 40 parts of glycerine, from 0.05 to 1.5 parts of a non-toxic surface active agent and not less than 10 parts water, totaling 100 parts by weight, applying the thus formed pigments marking fluid to a wet soft gelatin strip, forming gelatin capsules from said strip and thereafter drying the pigment marked capsules.

References Cited

UNITED STATES PATENTS

| | | | |
|---|---|---|---|
| 2,624,163 | 1/1953 | Stirn | 167—83 |
| 2,821,821 | 2/1958 | Chu Yen | 53—14 |
| 2,929,320 | 3/1960 | Hansen et al. | 53—131 |
| 3,166,429 | 1/1965 | Wich | 106—176 |
| 2,731,433 | 1/1956 | Johnson | 260—41 |
| 3,056,759 | 10/1962 | Mercier et al. | 260—41 |
| 3,061,576 | 10/1962 | Roth | 260—41 |
| 2,340,037 | 1/1944 | Zipper | 167—83 |
| 2,234,479 | 3/1941 | Scherer | 167—83 |
| 2,941,980 | 6/1960 | Robinson | 260—41 X |
| 2,944,037 | 7/1960 | Clark | 260—41 X |

OTHER REFERENCES

Horn: "Acrylic Resin," Reinhold Pub. Corp., New York, 1960, pp. 149–152.

ROBERT F. WHITE, *Primary Examiner.*

JAMES R. HALL, *Assistant Examiner.*